US008627146B2

(12) United States Patent
Bailey et al.

(10) Patent No.: US 8,627,146 B2
(45) Date of Patent: *Jan. 7, 2014

(54) MODEL-BASED TESTING OF AN APPLICATION PROGRAM UNDER TEST (75) Inventors: Thomas J. G. Bailey, Hatfield (GB); John W. Duffell, Winchester (GB); Mark S. Taylor, Salisbury (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/554,456

(22) Filed: Jul. 20, 2012

(65) Prior Publication Data
US 2012/0284567 A1 Nov. 8, 2012

Related U.S. Application Data (63) Continuation of application No. 12/632,892, filed on Dec. 8, 2009, now Pat. No. 8,245,080.

(30) Foreign Application Priority Data

Mar. 19, 2009 (EP) .................................... 09155558

(51) Int. Cl.
G06F 11/00 (2006.01)
(52) U.S. Cl.
USPC .......................................................... 714/33
(58) Field of Classification Search
USPC .......................................................... 714/33
See application file for complete search history.

(56) References Cited

U.S. PATENT DOCUMENTS

| 6,021,261 | A | 2/2000 | Barrett, Jr. et al. |
| 7,398,514 | B2 | 7/2008 | Ulrich et al. |
| 2003/0014734 | A1* | 1/2003 | Hartman et al. ............... 717/125 |
| 2003/0046609 | A1 | 3/2003 | Farchi et al. |
| 2005/0102596 | A1 | 5/2005 | Hekmatpour |
| 2005/0128471 | A1 | 6/2005 | Wilsher et al. |
| 2007/0168971 | A1 | 7/2007 | Royzen et al. |
| 2007/0282556 | A1 | 12/2007 | Achkar et al. |
| 2010/0241904 | A1 | 9/2010 | Bailey et al. |

OTHER PUBLICATIONS

"TTCN-3, Qtronic and SIP", Conformiq Software Ltd. http://www.conformiq.com/downloads/sip-white-paper.pdf 2006, 8 pages.
"U.S. Appl. No. 12/632,892 Final Office Action", Feb. 3, 2012, 10 pages.

(Continued)

Primary Examiner — Scott Baderman
Assistant Examiner — Jigar Patel
(74) Attorney, Agent, or Firm — DeLizio Gilliam, PLLC (57) ABSTRACT A method includes receiving a first processing request for an application program under test. The method includes generating a second processing request for a model of the application program, wherein the second processing request is equivalent to said first processing request. The method includes communicating said first and second requests to said application program under test and said model of the application program respectively. The method includes receiving a first response data set from the application program under test and a second response data set from the model of the application program. The method includes comparing said first and second response data sets and generating a success indication if said comparing said first and second response data sets does not identify a difference. The method includes generating an error indication if said comparing said first and second response data sets identifies a difference between the first and second data sets.

24 Claims, 5 Drawing Sheets (56) References Cited

OTHER PUBLICATIONS

"U.S. Appl. No. 12/632,892 Office Action", Jun. 24, 2011, 11 pages.

Prenninger, Wolfgang et al., "Abstractions for Model-Based Testing", Electronic Notes in Theoretical Computer Science (ENTCS) Jan. 2005, 12 pages.

Utting, Mark et al., "A Taxonomy of Model-Based Testing", Working Paper Series. University of Waikato, Department of Computer Science http://www.cs.waikato.ac.nz/pubs/wp/2006/uow-cs-wp-2006-04.pdf Apr. 2006, 18 pages.

* cited by examiner

MODEL-BASED TESTING OF AN APPLICATION PROGRAM UNDER TEST

RELATED MATTERS

This application claims the priority benefit of U.S. patent application Ser. No. 12/632,892 filed on Dec. 8, 2009, which claims priority to European Patent Application Number 09155558.1 filed Mar. 19, 2009, both of which are incorporated herein in their entirety.

BACKGROUND

Part of the process of building and maintenance of software systems is the testing of the system against defined requirements. Model-based testing systems utilize an instance of a software system under test in combination with a model of the system. The model is arranged to perform in accordance with the expected behavior of the software system under test. A set of tests is provided in combination with a set of checking rules for testing the behavior of both the software system under test and its model. One problem with such model-based testing systems is that their effective use involves detailed understanding of the rules and corresponding model.

SUMMARY

In some example embodiments, a method includes receiving a first processing request for an application program under test. The method includes generating a second processing request for a model of the application program, wherein the second processing request is equivalent to said first processing request. The method includes communicating said first and second requests to said application program under test and said model of the application program respectively. The method includes receiving a first response data set from the application program under test and a second response data set from the model of the application program. The method includes comparing said first and second response data sets. The method includes generating a success indication if said comparing said first and second response data sets does not identify a difference. The method includes generating an error indication if said comparing said first and second response data sets identifies a difference between the first and second data sets.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
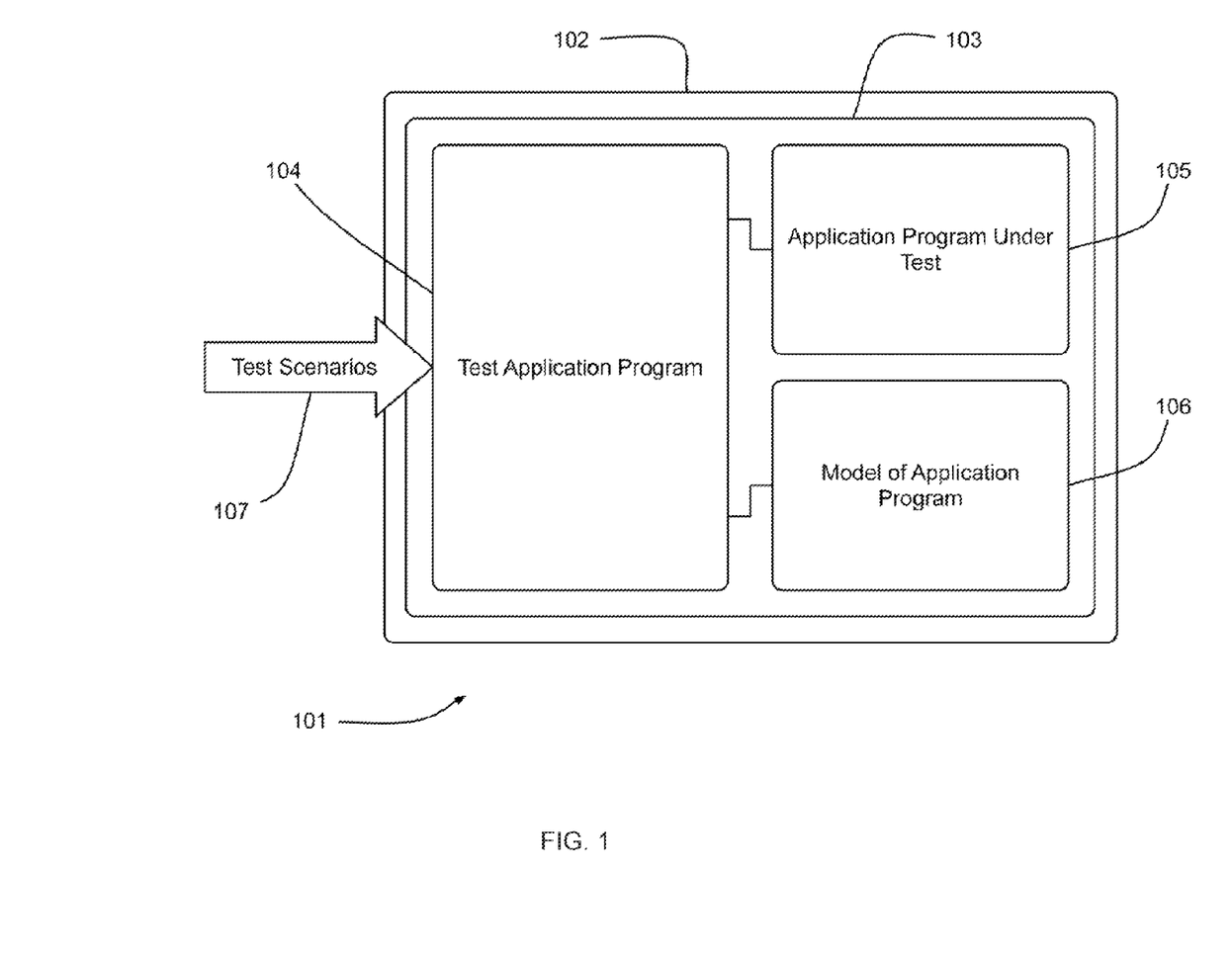
FIG. 1 is a schematic illustration of a software testing system.

With reference to FIG. 1, a software testing system 101 comprises a computer 102 loaded with an operating system 103. The operating system 103 provides a platform for a model based testing application program 104, which utilizes an instance of an application program under test 105 in combination with a model 106 of the application program under test. The model 106 is arranged to model the expected behavior of the application program under test 105 and also to provide an identical interface to the application program under test 105.

The test application program 104 is also arranged to provide an identical interface to the application program under test 105. Thus, the test application program 104 is arranged to accept processing requests, in the form of test scenarios 107, that comprise the expected operational user interaction with the application program under test 105. The test application program 104 is arranged to pass such processing requests to both the application program under test 105 and its model 106, analyze the response as described below and provide an indication of whether the processing request was a success or whether an error occurred. The test application program 104 indicates that the processing of a request was a success if the results received from both the application program under test 105 and its model 106 are equivalent. If the results received are different then the test application program 104 indicates that there was an error in the processing of the request by the application program under test 105.

Figure 2:
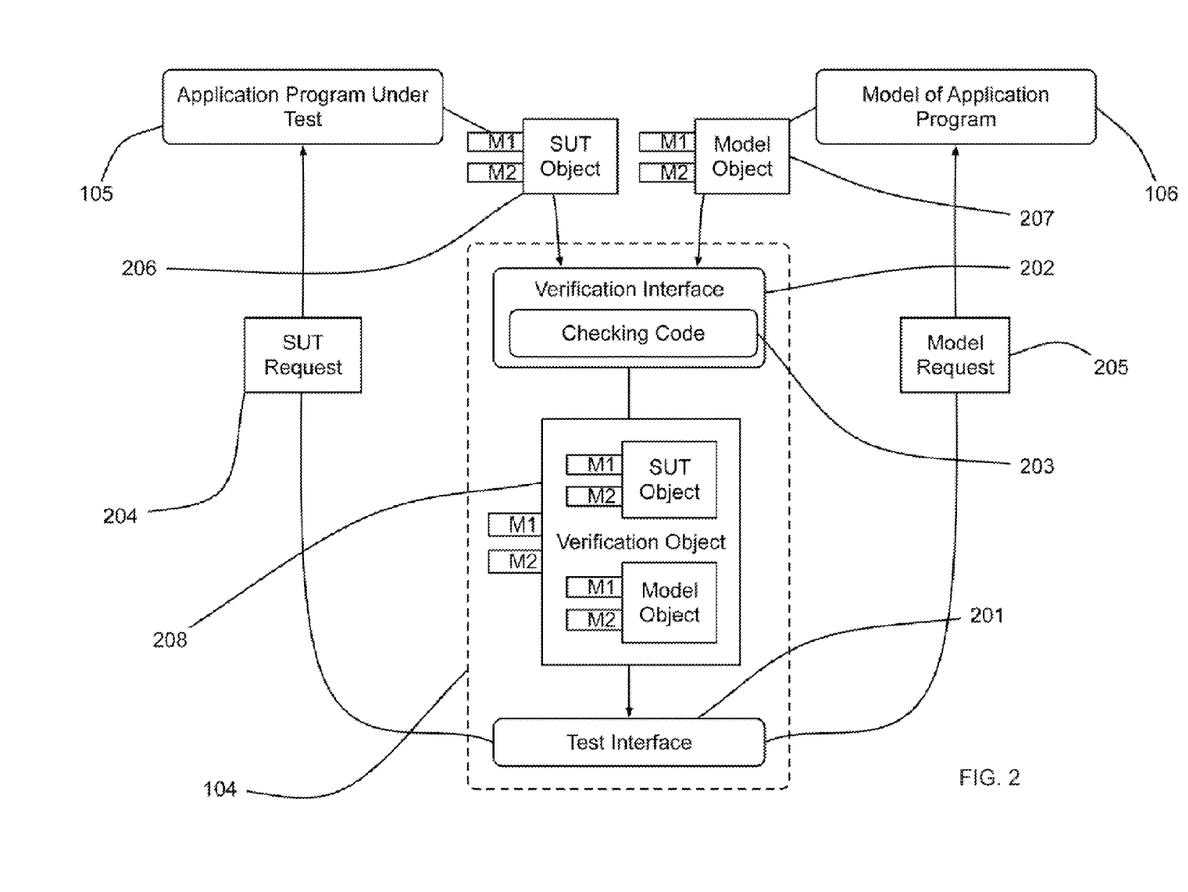
FIG. 2 is a schematic illustration of functional elements of the software testing system of FIG. 1.

With reference to FIG. 2, the test application program 104 comprises a test interface 201 and a verification interface 202. The verification interface 202 comprises checking code 203. The test interface 201 provides the test application program 104 a user interface that is identical to that provided by the application program under test 105, so as to enable a user to interact with the test application program 104 as if interacting directly with the application program under test 105. In addition, the test interface 201 provides facilities for observing and storing the results of the testing of the application program under test 105. In response to a processing request for the application program under test (SUT) 105 made via the test interface 201, the test interface 201 is arranged to duplicate the request and pass the original request to the application program under test (SUT) 105 and the duplicated request to the model 106. In the present embodiment, the application programs 105 and model 106 are implemented using object oriented programming techniques. Thus, the original and duplicate processing requests are passed to their respective targets in the form of respective sets of SUT and model request parameters 204, 205. As will be understood by those skilled in the art, such sets of parameters may comprise any suitable parameter types acceptable to the SUT 105 and model 106. The results of the processing of the requests 204, 205 by the SUT 105 and the model 106, respectively, are returned to the verification interface 202. The results comprise respective response data sets in the form, for example, of respective result objects 206, 207.

Figure 3:
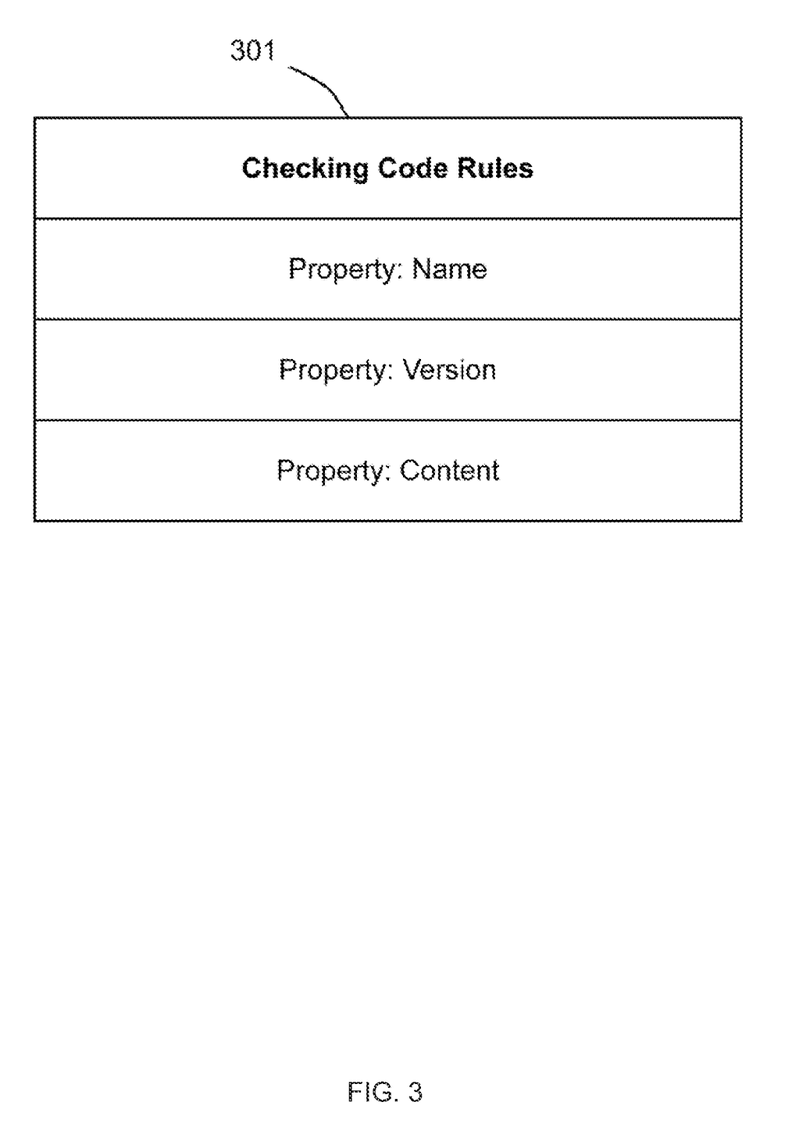
FIG. 3 is a table illustrating a set of checking code rules used in the software testing system of FIG. 2.

The verification interface 202 is arranged to compare the response data sets, in the form of the result objects 206, 207, using the checking code 203. As will be understood by those skilled in the art, checking code is generally specific to a given process or method. Therefore, since the test interface 201 comprises a plurality of such processes or methods, a corresponding plurality of subsets of checking code are correspondingly provided. With reference to FIG. 3, the checking code 203 for a given method utilizes a set of checking code rules 301 to compare features of each of the result objects 206, 207 so as to identify any differences. In the example of FIG. 3, the checking code rules 301 compare the object name, version and data content. If the checking code determines that all of the relevant attributes of the result objects 206, 207 are identical then the processing of the SUT 105 is deemed to be equivalent to the model 106 in respect of the original processing request. In response to such successful processing, the verification interface 203 is arranged to encapsulate both the result objects 206, 207 in a verification object 208 and pass this object 208 to the test interface 201. The verification object 208 is arranged to enable the test interface 201 to present the response from the SUT 105. In addition, if a further processing request is issued based on the received response, the verification object 208 preserves the state of the processing with both SUT 105 and the model 106 so as to provide the necessary continuity for such further processing requests. In addition, the verification object 208 carries sufficient data for the logging of the processing requests for a given testing scenario.

Figure 4:
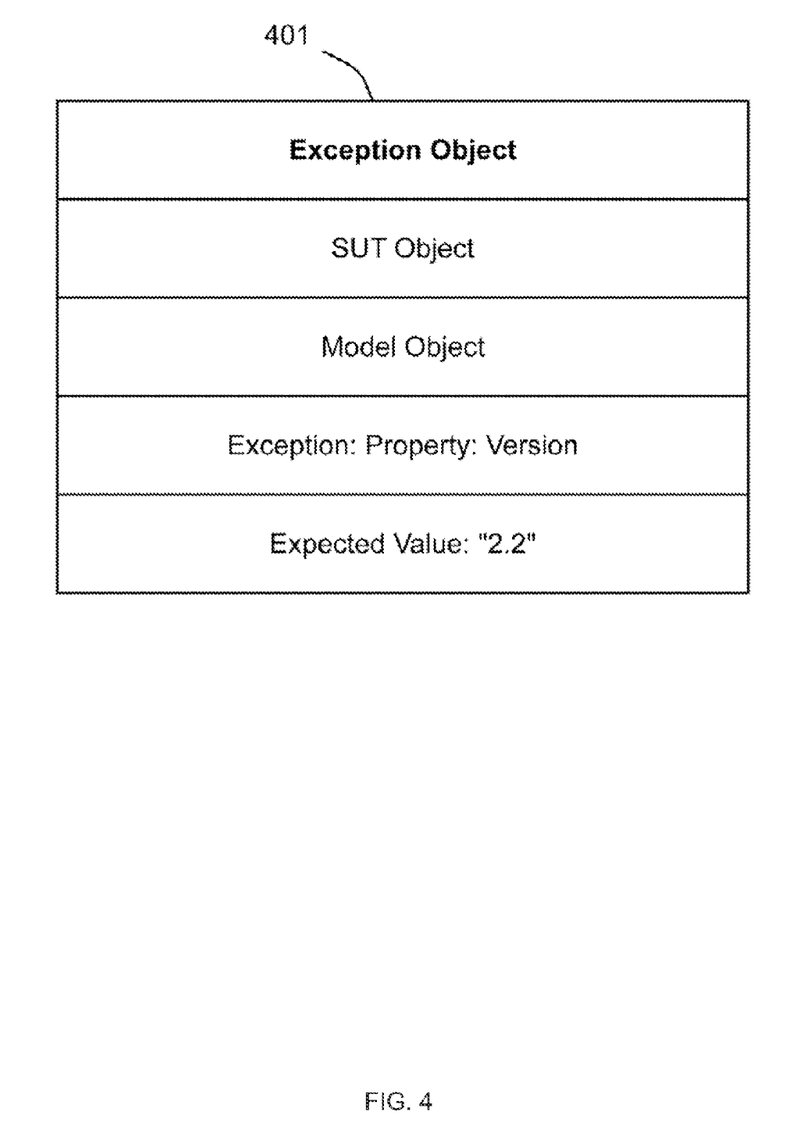
FIG. 4 is a table illustrating an exception produced in the software testing system of FIG. 2.

If the checking code 203 determines that one or more of the attributes of the result objects 206, 207 are different, this indicates a departure of the behavior of the SUT 105 from that of its model 106. In this case, the verification interface 202 is arranged to return an error to the test interface 201 in the form of an exception. In the present embodiment, with reference to FIG. 4, an exception is defined in an exception object 401. Each exception object 401, in common with a verification object 208, is associated with the relevant result objects. In addition, the exception object provides an indication of the property of the result objects that was identified as differing along with an indication of the value of that property that was expected. The expected property value is determined from the result object 207 received from the model 106. In the example of an exception object 401 in FIG. 4, the difference was identified in the "Property:Version" attribute of the SUT result object 206. The expected value for the "Property:Version" attribute identified from the model result object 207 was "2.2". In response to the receipt of an exception object 401, the test interface is arranged to log the exception and the user is provided with an option to continue with further processing requests if appropriate.

Figure 5:
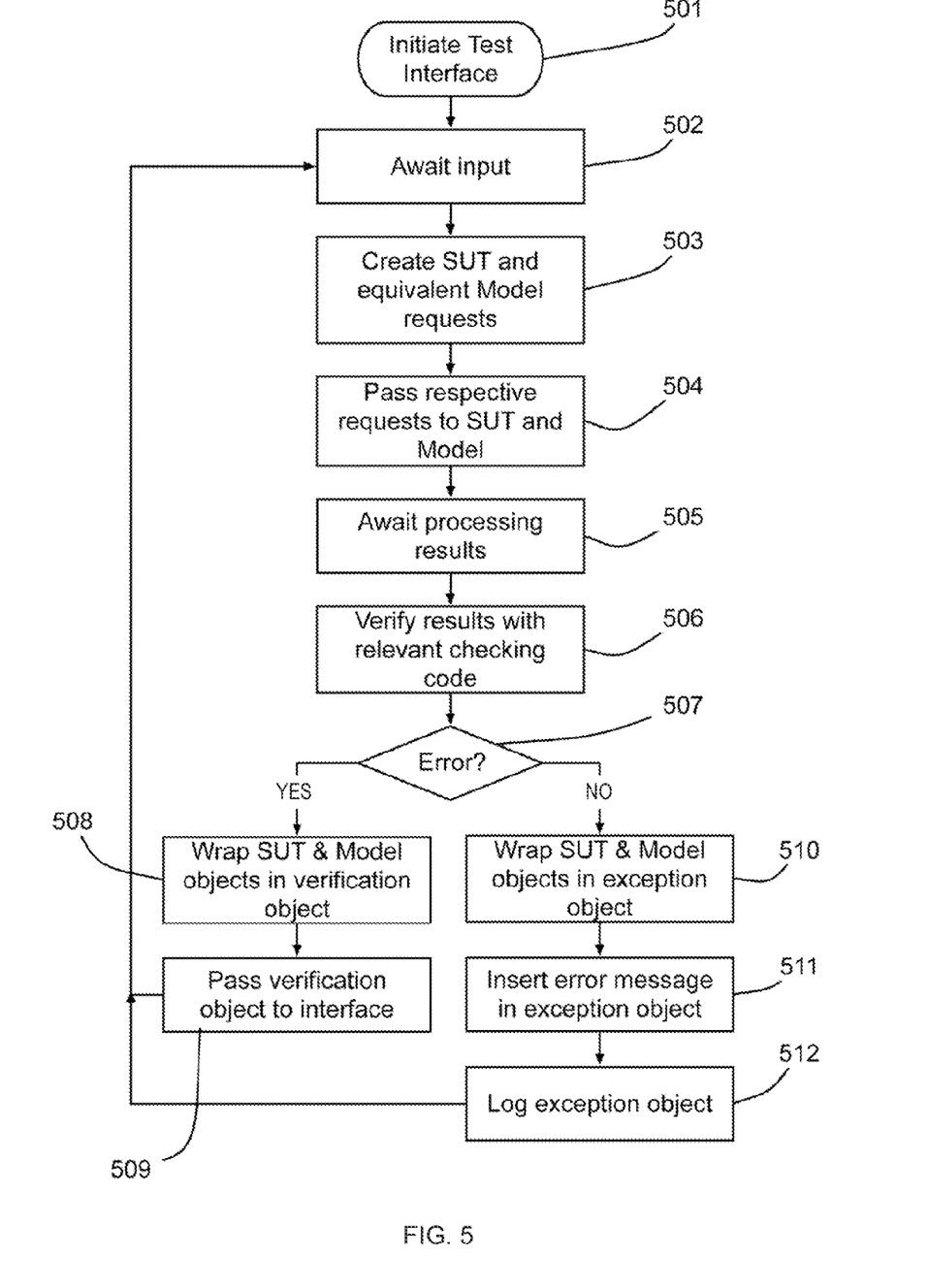
FIG. 5 is a flow chart illustrating processing performed by the software testing system of FIG. 2.

The processing performed by the test application program 104 when handling a processing request will now be described further with reference to the flow chart of FIG. 5. At step 501, processing is initiated in response to the start-up of the test application program 104, the SUT 105 and model 106 are identified and processing moves to step 502. At step 502, processing awaits the input of a processing request via the test interface 201 and, once a processing request is received moves to step 503. At step 503, in accordance with the functions of the duplicated SUT interface, an appropriate SUT request 204 is created along with an equivalent model request 205 and processing moves to step 504. At step 504, the SUT and model requests 204, 205 are passed to the SUT 105 and model 106 respectively and processing moves to step 505. At step 505, the result of the processing of the requests 204, 205 represented by the SUT and model objects 204, 205 is awaited in the form of the result objects 206, 207. Once the result objects 206, 207 are received processing moves to step 506. At step 506, the result objects 206, 207 are compared by the checking code 203 in accordance with the checking code rules 301 and processing moves to step 507.

At step 507, if the result objects 206, 207 are equivalent, that is, the checking code 203 identified no significant differences, then processing moves to step 508. At step 508, the result objects 206, 207 are wrapped in a verification object 208 and processing moves to step 509. At step 509, the verification object 208, indicating the success of the processing request, is passed to the test interface 201 for processing as a normal results return. Processing then returns to step 502. At step 507, if the result objects 206, 207 comprise one or more significant differences, then processing moves to step 510. At step 510, the result objects 206, 207 are wrapped in an exception object and processing moves to step 511. At step 511, an error message, indicating the identified differences and the expected values based on the model result object 207, is inserted in the exception object and processing moves to step 512. At step 512, the exception object is logged and processing moves to step 502 and proceeds as described above.

Some processing requests received by the test interface 201 may be based on previously received result objects 206, 207 wrapped in a verification object 208. In such cases, at step 503, the appropriate result objects 206, 207 are extracted from the verification object 208 so as to form the appropriate part of the relevant set of request parameters for the SUT 105 and model 106 respectively.

In another embodiment, the test application program is provided as the working front-end for the SUT enabling the SUT to be deployed while still providing a facility for monitoring discrepancies between the SUT and the model while the SUT is operational. The test interface may be arranged to avoid notifying a normal user of any received error notifications but instead to divert such error notifications to another predetermined user such as an administrator via a duplicate or other suitable interface.

In a further embodiment, the indication of the error or discrepancy is communicated to the test interface separately from the result objects or data sets. Identifiers may be provided in the error message or the result data sets to provide cross-referencing.

In another embodiment, where whole trees or graphs of SUT and model objects are returned from the SUT and model respectively, each object within the graph is wrapped up in a verification object so as to provide a graph of verification objects returned from the test interface.

The checking rules may be devised so as to check for any set of one or more identifiable discrepancies between the output of the SUT and the model.

While the embodiments described above may be implemented using object-orientated programming techniques, embodiments may also be proved using procedural or other programming techniques. Thus the objects described above that are used for communicating data between the test interface, verification interface, SUT and model may be replaced with equivalent communications means such as appropriate data sets or messages.

It will be understood by those skilled in the art that the apparatus that embodies a part or all of the present invention may be a general purpose device having software arranged to provide a part or all of an embodiment of the invention. The device could be a single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
 receiving a first processing request for an application program under test;
 generating a second processing request for a model of the application program, wherein the model of the application program is configured to model an expected behavior of the application program under test and configured to provide a same interface as an interface for the application program under test, wherein the second processing request is equivalent to said first processing request;
 communicating said first and second requests to said application program under test and said model of the application program respectively;
 receiving a first response data set from the application program under test and a second response data set from the model of the application program;
 comparing said first and second response data sets;
 generating a success indication if said comparing said first and second response data sets does not identify a difference;
 generating an error indication if said comparing said first and second response data sets identifies a difference between the first and second data sets;
 receiving a third processing request, which is based on the first response data set, for the application program under test;
 extracting a first parameter of the first response data set;
 communicating the third processing request with the first parameter to the application program under test;
 extracting a second parameter of the second response data set;
 generating fourth processing request equivalent to the third processing request; and
 communicating the fourth processing request with the second parameter to the model of the application program.

2. The method of claim 1, wherein said error indication comprises data indicating an attribute of the first and second response data sets that corresponds to the difference and indicating an expected value of the attribute.

3. The method of claim 1, wherein said generating the error indication comprises generating an exception.

4. The method of claim 1, wherein said error indication references said first and second response data sets.

5. The method of claim 1, wherein said comparing said first and second response data sets comprises executing a checking code on the first and second response data sets, wherein the checking code utilizes checking code rules.

6. The method of claim 5, wherein the checking code rules indicate an object name, an object version, and data content to be compared.

7. The method of claim 1, further comprising:
 receiving a third response data set from the application program under test and a fourth response data set from the model of the application program;
 comparing said third and fourth response data sets;
 generating a success indication if said comparing said third and fourth response data sets does not identify a difference; and
 generating an error indication if said comparing said third and fourth response data sets identifies a difference between the third and fourth response data sets.

8. The method of claim 7, wherein said generating the success indication for comparison of the first response data set and the second response data set comprises generating a verification object that encapsulates the first and second response data sets, wherein extracting the first parameter of the first response data set comprises extracting the first parameter of the first response data set from the verification object, wherein extracting the second parameter of the second response data set comprises extracting the second parameter of the second response data set from the verification object.

9. An apparatus comprising:
 at least one processor; and
 a test interface executable on the at least one processor, the test interface configured to be identical to a user interface of an application program under test, the test interface configured to,
  receive a first processing request for the application program under test,
  generate a second processing request equivalent to the first processing request,
  communicate the first processing request to the application program under test and the second processing request to a model of the application program, wherein the model of the application program is configured to model an expected behavior of the application program under test and configured to provide a same interface as an interface for the application program under test,
  receive a third processing request, which is based on the first response data set, for the application program under test;
  extract a first parameter of the first response data set;
  communicate the third processing request with the first parameter to the application program under test;
  extract a second parameter of the second response data set;
  generate fourth processing request equivalent to the third processing request; and
  communicate the fourth processing request with the second parameter to the model of the application program;
 a verification interface executable on the at least one processor, the verification interface configured to,
  compare a first response data set from the application program under test and a second response data set from the model of the application program,
  generate an error indication if a difference is determined from comparison of the first response data set and the second response data set and communicate the error indication to the test interface,
  generate a success indication if a difference is not determined from comparison of the first response data set and the second response data set and communicate the success indication to the test interface.

10. The apparatus of claim 9, wherein said error indication comprises data that indicates an attribute of the first and second response data sets that corresponds to the difference and indicating an expected value of the attribute.

11. The apparatus of claim 9, wherein the verification interface is configured to generate the error indication comprises the verification unit operable to generate an exception.

12. The apparatus of claim 9, wherein said error indication references said first and second response data sets.

13. The apparatus of claim 9, wherein the verification interface configured to compare said first and second response data sets comprises the verification interface configured to execute a checking code on the first and second response data sets, wherein the checking code utilizes checking code rules.

14. The apparatus of claim 13 wherein the checking code rules indicate an object name, an object version, and data content to be compared.

15. The apparatus of claim 9, wherein the verification interface is configured to,
  receive a third response data set from the application program under test and a fourth response data set from the model of the application program;
  compare said third and fourth response data sets;
  generate a success indication if said comparing said third and fourth response data sets does not identify a difference; and
  generate an error indication if said comparing said third and fourth response data sets identifies a difference between the third and fourth response data sets.

16. The apparatus of claim 15,
  wherein generation of the success indication for comparison of the first response data set and the second response data set comprises generation of a verification object that encapsulates the first and second response data sets,
  wherein extraction of the first parameter of the first response data set comprises extraction of the first parameter of the first response data set from the verification object, and
  wherein extraction the second parameter of the second response data set comprises extraction of the second parameter of the second response data set from the verification object.

17. A computer program product for model-based testing of an application program, the computer program product comprising:
  a non-transitory computer readable storage medium having computer usable program code embodied therewith, the computer usable program code comprising a computer usable program code configured to:
    receive a first processing request for the application program under test;
    generate a second processing request for a model of the application program, wherein the model of the application program is configured to model an expected behavior of the application program under test and configured to provide a same interface as an interface for the application program under test, wherein the second processing request is equivalent to said first processing request;
    communicate said first and second requests to said application program under test and said model of the application program respectively;
    receive a first response data set from the application program under test and a second response data set from the model of the application program;
    compare said first and second response data sets;
    generate a success indication if said comparing said first and second response data sets does not identify a difference;
    generate an error indication if said comparing said first and second response data sets identifies a difference between the first and second data sets;
    receive a third processing request, which is based on the first response data set, for the application program under test;
    extract a first parameter of the first response data set;
    communicate the third processing request with the first parameter to the application program under test;
    extract a second parameter of the second response data set;
    generate fourth processing request equivalent to the third processing request; and
    communicate the fourth processing request with the second parameter to the model of the application program.

18. The computer program product of claim 17, wherein said error indication comprises data indicating an attribute of the first and second response data sets that corresponds to the difference and indicating an expected value of the attribute.

19. The computer program product of claim 17, wherein the computer usable program code configured to generate the error indication comprises computer usable program code configured to generate an exception.

20. The computer program product of claim 17, wherein said error indication references said first and second response data sets.

21. The computer program product of claim 17, wherein the computer usable program code configured to compare said first and second response data sets comprises computer usable program code configured to execute a checking code on the first and second response data sets, wherein the checking code utilizes checking code rules.

22. The computer program product of claim 21, wherein the checking code rules indicate an object name, an object version, and data content to be compared.

23. The computer program product of claim 17, wherein the
  computer usable program code configured to is configured to,
  receive a third response data set from the application program under test and a fourth response data set from the model of the application program;
  compare said third and fourth response data sets;
  generate a success indication if said comparing said third and fourth response data sets does not identify a difference; and
  generate an error indication if said comparing said third and fourth response data sets identifies a difference between the third and fourth response data sets.

24. The apparatus of claim 23,
  wherein generation of the success indication for comparison of the first response data set and the second response data set comprises generation of a verification object that encapsulates the first and second response data sets,
  wherein extraction of the first parameter of the first response data set comprises extraction of the first parameter of the first response data set from the verification object, and
  wherein extraction the second parameter of the second response data set comprises extraction of the second parameter of the second response data set from the verification object.

* * * * *